United States Patent [19]

Marze

[11] 4,118,439

[45] Oct. 3, 1978

[54] POLYELECTROLYTES

[75] Inventor: Xavier Marze, Lyons, France

[73] Assignee: Rhone-Poulenc S.A., Paris, France

[21] Appl. No.: 764,176

[22] Filed: Jan. 31, 1977

Related U.S. Application Data

[63] Continuation of Ser. No. 268,066, Jun. 30, 1972.

[30] Foreign Application Priority Data

Jul. 2, 1971 [FR] France .................................. 71.24235

[51] Int. Cl.² .............................................. C08L 33/20
[52] U.S. Cl. ................... 260/858; 260/859 R;
  260/859 PV; 260/895; 526/240; 526/49;
  526/50; 526/265; 526/287; 528/46; 528/273
[58] Field of Search ............ 260/858, 859 R, 859 PV,
  260/2.1 E, 2.1 M, 874, 895, 823

[56] References Cited

U.S. PATENT DOCUMENTS

| 3,271,496 | 9/1966 | Michaels | 260/874 |
|---|---|---|---|
| 3,467,604 | 9/1969 | Michaels | 260/874 |
| 3,558,744 | 1/1971 | Michaels et al. | 260/2.1 |
| 3,565,973 | 2/1971 | Michaels | 260/2.1 |
| 3,579,613 | 5/1971 | Schaper et al. | 260/895 |
| 3,635,846 | 1/1972 | Splitz | 260/874 |

FOREIGN PATENT DOCUMENTS

| 1,493,043 | 7/1967 | France. |
|---|---|---|
| 1,493,044 | 7/1967 | France. |
| 1,493,045 | 7/1967 | France. |
| 1,493,046 | 7/1967 | France. |

*Primary Examiner*—Hosea E. Taylor
*Assistant Examiner*—Amelia B. Yarbrough
*Attorney, Agent, or Firm*—Stevens, Davis, Miller & Mosher

[57] ABSTRACT

Ionically crosslinked polymers which are soluble in a liquid organic medium and which correspond to the general formula:

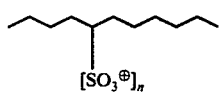

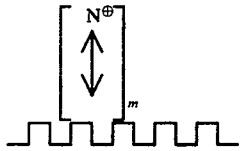

(I)

in which: the symbol N⊕ represents a quaternary nitrogen-containing group; the symbol

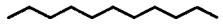

represents a macromolecular chain carrying groups which are capable of being linked, via a covalent bond, to -SO₃⊖ groups; the symbol

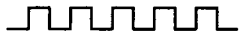

represents a macromolecular chain carrying groups which can give rise to the formation of N⊕ groups, the symbol

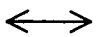

indicating that the N⊕ groups are linked to the macromolecular chain by at least one covalent bond, and the chains

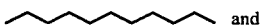 and

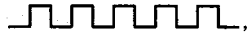

, considered together, do not contain oppositely charged groups which are capable of forming inter-chain covalent bonds, the ratio $n/m$ is between 0.1 and 10; and the nature of the units forming the macromolecular chains and the values of $n$ and $m$ being such that a polymer of formula ($I_1$)

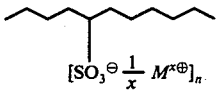

in which M represents a hydrogen ion or an alkali metal or alkaline earth metal ion and $x$ is 1 or 2, and a polymer of formula ($I_2$)

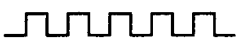

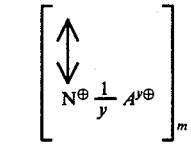

in which A represents a hydroxyl radical or the anion of an inorganic or organic acid of formula $AH_y$, $y$ being equal to 1, 2 or 3, are both insoluble in water but soluble in a common liquid organic medium are provided having properties making them suitable for use as, inter alia, membranes for ultrafiltration, dialysis and osmosis.

31 Claims, No Drawings

POLYELECTROLYTES

This is a continuation of application Ser. No. 268,066 filed June 30, 1972.

The present invention relates to polyelectrolytes.

Ionically crosslinked polymers have already been described. "Complex polyelectrolytes", which are crosslinked polymers obtained by reacting two polyelectrolytes carrying oppositely charged ionic groups, are known; see, for example, KIRK OTHMER, Encyclopedia of Chemical Technology, 16, pp. 117-133. The particular characteristics of these complex polyelectrolytes are (1) their insolubility in water and organic solvents, (2) their solubility in certain ternary mixtures of water, a polar organic solvent and a strongly ionised electrolyte, generally referred to as an ionic shielding solvent, and (3) the polyelectrolytes (polyanion and polycation) from which they are prepared are both soluble in water (op. cit. p. 117).

Thus JACKSON has shown (see U.S. Pat. No. 2,832,746, col. 2, lines 54-56) that the initial polyelectrolytes should be soluble in water to an appreciable extent, for example at least 1%. JACKSON also showed (see U.S. Pat. No. 2,832,747, col. 7, lines 74 and col. 8, lines 45-47) that it was preferable to use the initial polyelectrolytes in the form which was most soluble in water. Alan. S. MICHAELS (see, for example, Canadian Pat. Nos. 838,717, 838,718, 838,719, 838,720 and 838,721) also refers to complex polyelectrolytes originating from polyanions and polycations which are soluble in water and describes various adjuvants of the ionic shielding solvent type which are intended to make it possible to shape these complex polyelectrolytes.

The complex polyelectrolytes described above possess valuable properties which have made it possible to use them in the most diverse fields (e.g. as membranes for ultrafiltration, dialysis and inverse osmosis, battery dividers as well as medical and surgical applications). However, the various publications relating to ionic shielding solvents show that the insolubility of these polymers in practically all solvents, although this is an advantage in the final product, leads to great difficulties during shaping of such complex polyelectrolytes.

New ionically crosslinked polymers, hereafter called "complex polyelectrolytes", have now been found, according to this invention, which can be shaped without employing an ionic shielding solvent and which can be used to produce films and shaped objects which possess excellent properties in most diverse fields. The new complex polyelectrolytes according to the invention are characterised, firstly, in that they are soluble in organic solvents, without employing ionic shielding solvents, whilst being insoluble in water, and, secondly, in that they are prepared from anionic and cationic polyelectrolytes which are, individually, insoluble in water.

According to the present invention there is provided an ionically crosslinked, shaped or unshaped, polymer which is soluble in an organic medium and which corresponds to the general formula:

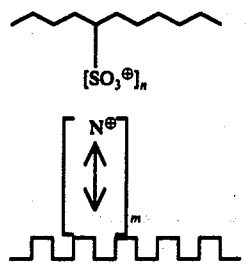

in which the symbol $N^\oplus$ represents a quaternary ammonium nitrogen-containing group, the symbol

represents a macromolecular chain carrying groups which are capable of being linked, via a covalent bond, to $-SO_3^\ominus$ groups, the symbol

represents a macromolecular chain carrying groups which can give rise to the formation of $N^\oplus$ groups, the symbol

indicating that the $N^\oplus$ groups are linked to the macromolecular chain by at least one covalent bond, the chains

considered together, not containing oppositely charged groups which are capable of forming inter-chain covalent bonds, the ratio $n/m$ is between 0.1 and 10 and the nature of the units forming the macromolecular chains

as well as the values of the symbols $n$ and $m$ is such that a polymer of the formula

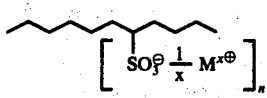

in which the macromolecular chain is essentially the same i.e. has the same length and the same structure as that of symbol

in formula (I), and M represents a hydrogen ion or an alkali metal or alkaline earth metal ion and $x$ is equal to 1 or 2, and a polymer of the formula

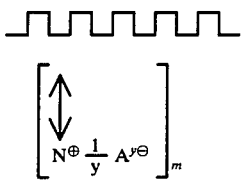  (I$_2$)

in which the macromolecular chain is essentially the same as that of symbol

in formula (I), and A represents a hydroxyl radical or the anion of an inorganic or organic acid of the formula AH$_y$, $y$ being equal to 1, 2 or 3, are both insoluble in water but soluble in one and the same liquid organic medium.

For simplicity, the part of the complex polyelectrolyte of the formula (I'$_1$):

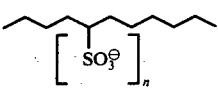

will be called "polyanion" and the part of the formula (I'$_2$):

will be called "polycation": likewise, the polymer of formula (I$_1$) will be called "sulphonic acid polymer" and the polymer of formula (I$_2$) "ammonium polymer".

The present invention also provides a process for producing the complex polyelectrolytes of formula (I), which comprises mixing a solution, in an organic solvent, of a sulphonic acid polymer of formula (I$_1$) with a solution, in the same solvent or in a solvent which is miscible with the above solvent and which is compatible with the sulphonic acid polymer, of an ammonium polymer of formula (I$_2$). The complex polyelectrolyte of the formula I can then be isolated from the reaction medium.

In general terms, the presence of ionic groups in macromolecular chains increases the solubility of these polymers in water. Although the polymers of formula (I$_1$) and (I$_2$) possess hydrophilic groups, they must, on the other hand, be insoluble in water. The insolubility in water can be achieved, firstly, by increasing the molecular weight of the polymer and, secondly, by limiting the number of hydrophilic groups linked to the macromolecular chains

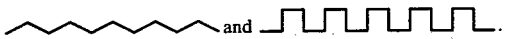

With regard to the molecular weight, in general terms, the specific viscosity of each of the polymers of formula (I$_1$) and (I$_2$) should generally be greater than 0.01; preferably, it is between 0.05 and 1.5 (measured at 25° C. on a 2 g/liter solution in dimethylformamide. With regard to the number of hydrophilic groups, in general terms, in each of the polymers of formula (I$_1$) and (I$_2$), there should generally be less than 1 hydrophilic group per 12 carbon atoms and preferably less than 1 hydrophilic group per 20 carbon atoms.

The hydrophilic groups can consist solely of —SO$_3^\ominus$ and N$^\oplus$ groups. The polyanion and polycation can also contain a small proportion of hydrophilic groups other than these. These hydrophilic groups can be anionic groups, such as carboxylic acid groups, sulphate or acid sulphate groups, phosphonic acid groups, phosphate groups or sulphamic acid groups; cationic groups, such as amine salts or compounds possessing a phosphonium or sulphonium group; and non-ionic groups, such as hydroxyl, ether, carboxylate (ester) or amide groups. When the polyanion and polycation contain hydrophilic groups other than, respectively, —SO$_3^\ominus$ and N$^\oplus$ groups, it is preferable that these additional groups are non-ionic or carry ionic groups of the same charge as the characteristic groups of the polymer. It would not, however, be outside the scope of the invention to use slightly ampholytic polymers, that is to say, a polyanion and/or a polycation containing, respectively, a small proportion of cationic and anionic groups.

The expression "small proportion" means, in the present context, that the ratios $$\frac{\text{number of cationic groups}}{\text{number of } -\text{SO}_3^\ominus \text{ groups}}$$

in the polyanion and $$\frac{\text{number of anionic groups}}{\text{number of N}^\oplus \text{ groups}}$$

in the polycation are each less than 5%.

In general terms, with regard both to the polyanion and to the polycation, the ratio $$\frac{\text{number of hydrophilic groups other than } -\text{SO}_3^\ominus \text{ or N}^\oplus}{\text{number of } -\text{SO}_3^\ominus \text{ or N}^\oplus \text{ groups}}$$

is less than 1.

The macromolecular chains represented by the symbols

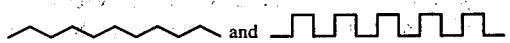

can each be of very different types.

More precisely, the sulphonic acid polymer can be chosen from, for example, (α) the polymerisation products of monomers at least a part of which are monomers carrying sulphonic acid groups; and (β) the products obtained by sulphonating polymers obtained from monomers free from sulphonic acid groups.

The term "polymer" as used herein is to be understood in the wide sense and includes poly-addition products, obtained, for example, by opening carbon-carbon double bonds, as well as polycondensation products.

Amongst the polymers of group α), there may be mentioned, in particular, vinyl polymerisation products which can be defined as consisting essentially of a plurality of units of the formulae

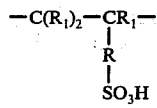     (II)

optionally, combined with units of the formula

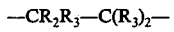     (III)

in which the various $R_1$ radicals, which may be identical or different, each represents hydrogen or an alkyl radical with 1 to 4 carbon atoms.

R can represent: either a simple valency bond; or a wholly hydrocarbon divalent group, the free valencies of which are carried by a wholly aliphatic, saturated or unsaturated, straight or branched chain, or by an aromatic ring, or by a chain, one of the free valencies being carried by an aliphatic carbon atom and the other free valency by an aromatic carbon atom; or a —O—R'— or —S—R'— group, R' representing a divalent group such as defined above for R; or a divalent group consisting of wholly hydrocarbon, aliphatic and/or aromatic groups, linked to one another by oxygen or sulphur atoms, the free valencies being carried by aliphatic and/or aromatic carbon atoms; or divalent groups such as defined above, one or more carbon atoms of which carry, in addition, substituents such as halogen atoms or hydroxyl radicals.

In formula (III), the various symbols $R_2$, which may be identical or different from one another and which may vary from one unit of formula (III) to another, each represents a hydrogen atom, a halogen atom or an alkyl radical with 1 to 4 carbon atoms; each $R_3$ radical, which may be identical or different, is as defined under $R_2$ or represents a group chosen from radicals of the formulae

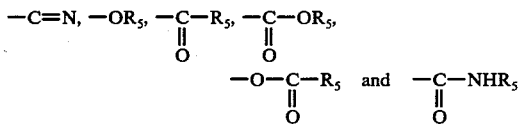

in which $R_5$ represents a hydrogen atom or a linear or branched alkyl radical containing 1 to 30 carbon atoms, a cycloalkyl radical containing 5 or 6 ring atoms, an aryl radical, an alkoxyaryl radical or an aralkoxy radical.

By way of illustration monomers which lead, on polymerisation, to units of formula (II), include the following acids (which may be in the form of salts): vinylsulphonic acid, 1-propene-1-sulphonic acid, allylsulphonic acid, methallylsulphonic acid, allyloxyethylsulphonic acid; 1-butene-1-sulphonic acid, 2-butene-1-sulphonic acid and 3-butene-1-sulphonic acid; hexenesulphonic acids, especially 1-hexene-1-sulphonic acid; methylbutenesulphonic acids, methallyloxyethylsulphonic acid, 3-allyloxy-2-propanol-1-sulphonic acid, allylthioethylsulphonic acid and 3-allylthio-2-propanol-1-sulphonic acid; vinylbenzenesulphonic acids, especially 3-vinyl-1-benzenesulphonic acid; vinyloxybenzenesulphonic acids, especially 2-vinyloxy-1-sulphonic acid and 4-vinyloxy-1-benzenesulphonic acid; isopropenylbenzenesulphonic acids, especially o-isopropenyl-benzenesulphonic acid and p-isopropenylbenzene-sulphonic acid; bromovinylbenzenesulphonic acids, especially 2-bromo-3-vinyl-1-benzenesulphonic acid and 4-bromo-3-vinyl-1-benzenesulphonic acid; α-methylstyrenesulphonic acids, α-ethylstyrenesulphonic acids and isopropenylcumenesulphonic acids; mono-, di- and trihydroxyvinylbenzenesulphonic acids; 2,5-dichloro-1-vinylbenzenesulphonic acids, isopropenylnaphthalenesulphonic acids and vinyldichloronaphthalenesulphonic acids; o and p-allylbenzenesulphonic acids and o- and p-methallylbenzenesulphonic acids; 4-(o- and p-isopropenylphenyl)-1-n-butanesulphonic acids; vinylchlorophenylethanesulphonic acids; o and p-allyloxybenzenesulphonic acids; o- and p-methallyloxybenzenesulphonic acids; vinylhydroxyphenylmethanesulphonic acids; vinyltrihydroxyphenylethanesulphonic acids; and 2-isopropyl-ethylene-1-sulphonic acid.

Examples of monomers which lead, on polymerisation, to units of formula (III), include ethylene, styrene, vinyl bromide, vinyl chloride, vinylidene chloride, acrylonitrile, vinylidene cyanide, methacrylonitrile, allyl alcohol, vinyl and allyl ethers such as methyl vinyl ether, ethyl vinyl ether, propyl vinyl ether, cyclohexyl vinyl ether, benzyl vinyl ether, methyl allyl ether, ethyl allyl ether, propyl allyl ether, cyclohexyl allyl ether and benzyl allyl ether, vinyl ketones, such as methyl vinyl ketone and ethyl vinyl ketone, unsaturated monocarboxylic acids such as acrylic, methacrylic, crotonic and itaconic acids, and their alkyl or aryl esters, in particular, methyl, ethyl, butyl and benzyl esters, cyano(meth-)acrylic esters such as ethyl α-cyano-acrylate, optionally partially saponified vinyl esters of linear aliphatic monocarboxylic acids such as vinyl acetate, vinyl propionate, vinyl laurate and vinyl stearate or of branched aliphatic monocarboxylic acids such as the vinyl esters of acids in which the carboxyl group is situated in the α-position relative to a tertiary or quaternary carbon atom, vinyl esters of aromatic acids such as vinyl benzoate, unsaturated polycarboxylic acids such as maleic acid or its anhydride, fumaric acid, citraconic acid, mesaconic acid and aconitic acid as well as their mono-, di- and, where appropriate, tri-alkyl esters, in particular, ethyl, propyl, butyl, hexyl, 2-ethyl-hexyl, octyl, β-hydroxyethyl, cycloalkyl or aryl esters, amides of unsaturated acids such as crotonamide, acrylamide and methacrylamide and the products of the reaction of the above-mentioned acids with a primary monoamine such as methylamine, ethylamine, propylamine, cyclohexylamine and aniline.

As particular examples of polymers of group (α), containing units of formulae (II) and (III), there may be mentioned the copolymers of acrylonitrile with methallylsulphonic acid or its salts. In these copolymers, the proportion of units originating from the acid possessing a —$SO_3H$ group is generally between 1 and 30%, preferably between 4 and 20%, by weight based on the total weight of the copolymers.

It will be apparent from what has already been stated that some of the units of formula (III) can possess hydrophilic groups. It is to be understood that the amount of monomer carrying hydrophilic groups which is employed must be such that the specified proportion of these groups in the macromolecular chain is not exceeded. It is particularly easy to achieve this result by using a copolymer originating from several different monomers, a part at least of these monomers being free from hydrophilic groups.

Other examples of polymers of group (α) are polycondensates originating from monomers of which some at least carry one or more —$SO_3H$ substituents. Particular examples of such polycondensates are those comprising a plurality of units of the formulae:

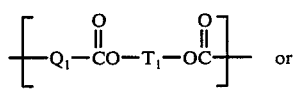 (IV)

or

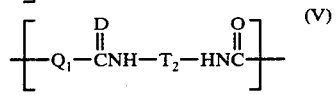 (V)

in which $Q_1$ represents the radical of a diacid of the formula $HOOC - Q_1 - COOH$, $T_1$ represents the radical of a diol of the formula $HO - T_1 - OH$ and $T_2$ represents the radical of a diamine of the formula $H_2N-T_2-NH_2$, the radical represented by $Q_1$ carrying a $-SO_3H$ substituent.

By way of illustration radicals represented by $T_1$ and $T_2$ may be straight chain or branched chain aliphatic radicals containing 3 to 10 carbon atoms, cycloaliphatic radicals with 5 or 6 carbon atoms in the ring, monocyclic aromatic radicals which are unsubstituted or substituted by one or two alkyl radicals with 1 to 4 carbon atoms, or radicals consisting of several cycloaliphatic or aromatic radicals bonded directly to one another or via a divalent hydrocarbon radical containing 1 to 4 carbon atoms or via a hetero-atom such as oxygen, sulphur and nitrogen, or via a divalent group such as $-SO_2-$.

Examples of radicals represented by the symbol $Q_1$ include, in particular, alkylene radicals containing 3 to 10 carbon atoms and phenylene radicals, these various radicals carrying a $-SO_3H$ substituent. Particular examples of diacids of formula $HOOC-Q_1-COOH$ include sulphosuccinic acid and 5-sulpho-isophthalic acid.

It is to be understood that in the preparation of polycondensates of formula (IV) and (V), and especially with a view to controlling the proportion of sulphonic acid groups in the polycondensate, the above-mentioned acid can be used in conjunction with other diacids, for example, aliphatic diacids such as succinic, glutaric, adipic, pimelic, suberic, azelaic, sebacic, maleic and fumaric acids; cycloalkanedicarboxylic acids, such as cyclohexane-1,4-dicarboxylic acid; and aromatic acids such as benzene-dicarboxylic acids.

As examples of diols, there may be mentioned 1,2-ethanediol, 1,2- and 1,3-propanediol, 1,2-, 1,3- and 1,4-butanediol, 1,5-pentanediol, 1,6-hexanediol, 1,10-decanediol, 2,2-dimethyl-1,3-propanediol and 1,2-diethyl-1,3-propanediol.

As examples of diamines, there may be mentioned ethylene-diamine, 1,2-diamino-propane, 2,2-bis-(4-aminocyclohexyl)-propane, 1,6-diamino-hexane, meta-phenylenediamine, 2,3-, 2,7- and 3,6-diamino-carbazoles and N,N'-bis-(carbonamidopropyl)-hexane-1,6-diamine.

The polymers of group ($\beta$) are obtained by attaching sulphonic acid groups to a macromolecular chain. It is possible to attach such groups to polymers comprising recurring units of the formula:

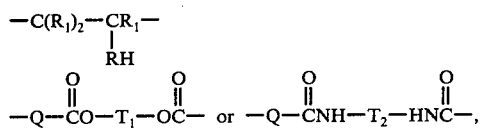

in which R, $R_1$, $T_1$ and $T_2$ are as defined above, and Q represents a radical as defined under $Q_1$ but free from $-SO_3H$ groups.

Other types of polymers which can be sulphonated are those containing a plurality of units of the formula:

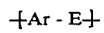 (VI)

in which each Ar radical, which can differ from one unit to another, represents a divalent aromatic radical or a divalent radical carrying at least one aromatic substituent, and each E radical, which can differ from one unit to another, represents a divalent group, namely $-O-$, $-SO_2-$, $-(CH_2)_v-$, $v$ being from 1 to 4, or $-C(CH_3)_2-$.

Examples of aromatic radicals represented by Ar include phenylene radicals, optionally substituted by one or two alkyl or aryl radicals, in particular p-phenylene and radicals of the formula:

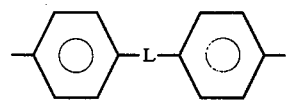

in which L represents an alkylene or alkylidene radical containing 1 to 12 carbon atoms or a $-CO-$ group.

As examples of polymers containing chains of formula (VI), there may be mentioned, in particular, phenolic polyethers, such as those described in U.S. Pat. No. 3,306,875, and polymers containing a plurality of

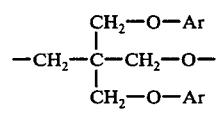

units.

As polymers which can be sulphonated, polyaryl ether sulphones of the general formula:

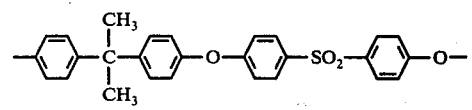

are preferably used; such polymers are described in, for example French Pat. No. 1,407,301.

The particular techniques for sulphonation have been described in the literature. In particular, Everet E. GILBERT, in "Sulphonation and Related Reactions", 1965, Interscience Publishers, has extensively described means for attaching sulphonic acid (or sulphonate) groups to the most diverse organic groups.

Like the sulphonic acid polymer, the ammonium polymer can belong to one of two categories of polymer; it can, in effect, consist: either of products obtained by treating a polymer ($\alpha'$) carrying tertiary amine groups with a quatornising agent, or of products obtained by reacting a tertiary amine with a polymer ($\beta'$) carrying substituents which are capable of quaternising the said amine, thereby bonding it to the polymer ($\beta'$).

The polymers of the group ($\alpha'$) can be, for example, a polymer containing a plurality of units of the formula:

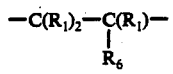 (VII)

optionally with a plurality of units of formula (III) (given above), $R_1$ being as defined above and $R_6$ representing a $-N(R_7)_2$ group or a monovalent hydrocarbon radical, chosen from linear or branched alkyl radicals containing 1 to 12 carbon atoms, cycloalkyl radicals with 5 or 6 carbon atoms in the ring and phenyl radicals, these various radicals carrying a $-N(R_7)_2$ substituent, or radicals consisting of a heterocyclic structure containing 1 or 2 nitrogen atoms with 5 or 6 ring members, optionally combined with 1 or 2 aromatic rings, the atom or at least one of the atoms of nitrogen in the heterocyclic structure being bonded by its three valencies to adjacent carbon atoms within the heterocyclic structure, or being bonded by two valencies to the said carbon atoms and by the third to a $-R_7$ group, each of the $R_7$ radicals, which may be identical or different, representing an alkyl radical with 1 to 6 carbon atoms.

By way of illustration, monomers which lead, on polymerisation, to units of formula (VII) include vinyldimethylamine, allyldimethylamine, 1-dimethylamino-1-propene, 2-dimethylamino-1-propene, 1-dimethylamino-2-butene, 4-dimethylamino-1-butene, 3-dimethylamino-1-butene, 3-dimethylamino-2-methyl-1-propene, methylethylallylamine, vinyldiethylamine, 5-dimethylamino-1-pentene, 4-dimethylamino-3-methyl-1-butene, methylpropylallylamine, allyldiethylamino, 6-dimethylamino-1-hexene, ethylvinylbutylamine, allyldiisopropylamine, 3-dimethylamino-2-propyl-1-pentene, allyldibutylamine, dialkylaminostyrenes, in particular dimethylaminostyrene and diethylamino-styrene, vinylpyridines, in particular N-vinylpyridine, 2-vinyl-pyridine, 3-vinyl-pyridine and 4-vinyl-pyridine, and their substituted derivatives such as 5-methyl-2-vinyl-pyridine, 5-ethyl-2-vinyl-pyridine, 6-methyl-2-vinyl-pyridine, 4,6-dimethyl-2-vinyl-pyridine, 6-methyl-3-vinyl-pyridine, N-vinylcarbazole, 4-vinyl-pyrimidine and 2-vinyl-benzimidazole.

Specific examples of polymers of group ($\alpha'$) containing units of formulae (VII) and (III) are the copolymers of acrylonitrile and a vinylpyridine. In these copolymers, the proportion of units originating from the amine-type monomer is generally between 1 and 50%, preferably between 4 and 30%, by weight relative to the total weight of the copolymer.

The polymers of group ($\alpha'$) can also consist of condensation products of monomers at least a part of which contains tertiary nitrogen atoms. Such polycondensates can contain a plurality of units of formula (VIII) or (IX)

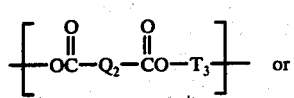 or (VIII)

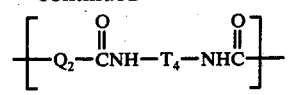 (IX)

in which $Q_2$ represents the radical of a diacid of the formula $HOOC-Q_2-COOH$, $T_3$ represents the radical of a diol of the formula $HO-T_3-OH$ and $T_4$ represents the radical of a diamine of the formula $H_2N-T_4-NH_2$, at least one of the radicals $Q_2$ and $T_3$ and $T_4$ containing a tertiary nitrogen atom.

It is to be understood that, in the case where the polycondensate contains units of formula (VIII), it can consist of these units alone (polyester) or it can contain urethane or urea groups. In the latter case, the polymer will consist of a chain comprising rows of units of formula (VIII) bonded to other rows of units of formula (VIII) via

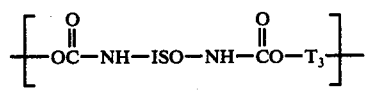

groups (ISO representing the radical of a diisocyanate of the formula $O=C=N-ISO-N=C=O$) and, where appropriate, via

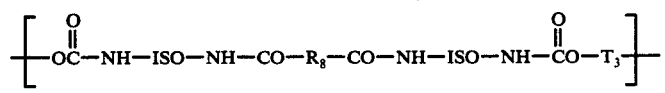

groups, $R_8$ representing a valency bond or a group chosen from amongst the groups of the formula: $-O-$, $-NH-NH-$, $-HN-T_4-NH-$, $-O-T_3-O-$ and $-NH-NH-CO-NH-$.

In general terms, when $Q_2$ represents the radical of a diacid containing a tertiary nitrogen atom, it is an alkylene radical containing two to 12 carbon atoms, substituted by a dialkylamino radical or interrupted by an alkylimino radical; a cycloalkylene or arylene radical substituted by a dialkylamino radical, or two of these rings connected by a alkylimino radical; or a nitrogen-containing heterocyclic structure with 5 or 6 ring members, containing 1 or 2 nitrogen atoms, this atom or one of them being bonded by its three valencies to neighbouring carbon atoms or by two valencies to neighbouring carbon atoms and by the third to an alkyl radical of 1 to 4 carbon atoms.

When $T_4$ represents the radical of a diamine with a tertiary nitrogen, it can be chosen from amongst the radicals represented by $Q_2$.

In general terms, when $T_3$ represents a radical of a diol possessing a tertiary nitrogen atom, it is a linear or branched, aliphatic, hydrocarbon radical containing 2 to 12 carbon atoms, which may be saturated or which may possess ethylenic or acetylenic unsaturation, substituted only, or at least, by one dialkylamino radical or interrupted by an alkylimino radical.

Examples of suitable diacids possessing a tertiary nitrogen atom include, in particular, methylimino-diacetic acid, 3-dimethylamino-hexane-dioic acid, 1-dimethylaminocyclopentane-2,3-dicarboxylic acid, dimethylaminoisophthalic acid, dimethylaminoterephthalic acid, 1-methylpyrimidine-dicarboxylic acid and 1-methyl-imidazole-4,5-dicarboxylic acid.

Examples of suitable diols possessing a tertiary nitrogen atom include, in particular, alkylamines substituted on the nitrogen atom by two hydroxyalkyl radicals, such as ethyldiethanolamine, or alkylene glycols substituted by a dialkylamino group on a non-hydroxylic carbon atom, such as γ-dimethylamino-propylene glycol and γ-diethylamino-propylene glycol.

Examples of suitable diamines containing a tertiary nitrogen atom include 3-dimethylamino-hexane-1,6-diamine, 3-(N-methyl-piperazino)-hexane-1,6-diamine, 3-pyrrolidino-hexane-1,6-diamine, 3-piperidino-hexane-1,6-diamine, 3-morpholino-hexane-1,6-diamine, N-bis-(3-aminopropyl)-methylamine, N-bis-(3-aminopropyl)-cyclohexylamine and N-bis-(3-amino-propyl)-aniline.

The diacids, diols and diamines which do not contain tertiary nitrogen atoms and which can take part in the preparation of the polycondensates of formula (VIII) and (IX) can be chosen from amongst the various diacids, diols and diamines mentioned above.

Examples of diisocyanates of the formula O=C=N-ISO-N=C=O which can be used for the preparation of polycondensates of the polyurethane type, include 1,6-diisocyanato-hexane, 2,4-diisocyanato-toluene, 2,6-diisocyanatotoluene, meta-diisocyanato-benzene, 2,2-bis-(4-isocyanatocyclohexyl)-propane, bis-(4-isocyanato-cyclohexyl)-methane, 1,5-diisocyanato-pentane, 1,4-diisocyanato-cyclohexane and bis-(4-isocyanato-phenyl)-methane.

As examples of compounds which can be used in association with these isocyanates in order to obtain

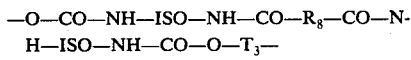

groups, there may be mentioned water, hydrazine and aminoacetyl hydrazide as well as the diols and diamines, with or without a tertiary nitrogen atom, mentioned above.

As particular examples of polycondensates containing tertiary nitrogen groups, there may be mentioned polyesterurethanes obtained from a diol containing a tertiary nitrogen atom, such as ethyldiethanolamine, from adipic acid and from a diisocyanate such as 4,4'-diisocyanato-diphenyl-methane, the coupling agent optionally used being a diol or amino-acetyl hydrazide. In these polymers, the molecular weight of the intermediate polyester is generally between 300 and 10,000.

The quaternising agents for tertiary amine groups as well as the conditions employed have been described in the literature. In general terms, esters of inorganic acids such as halides and alkyl sulphates, cycloalkyl sulphates and aralkyl sulphates are used. The alkyl, cycloalkyl and aralkyl radicals preferably contain, at most, 14 carbon atoms. Examples of such quaternising agents include methyl, ethyl, propyl, cyclohexyl and benzyl chlorides, bromides and iodides, and dimethyl and diethyl sulphates. It is also possible to use halogenated derivatives containing other chemical groups such as chloroacetaldehyde.

The substituents of the polymers of group (β') which are capable of reacting with a tertiary amine to give quaternary ammonium groups are generally halogen atoms. The polymers of group (β') can thus be defined as containing a plurality of units of formula (X):

in which Δ represents an organic radical containing a halogen substituent and E is as defined above. It is to be understood that the polymers of group (β') can contain, combined with the units of formula (X), units which are free from halogenated groups.

The presence of halogenated groups in the polymers of group (β') can be achieved by polymerising monomers containing such groups. Examples of this type include homo and copolymers of 2-chloroethyl methacrylate.

More generally, the halogenated polymers can be obtained by attaching halogenated groups to macromolecular chains which are free from such groups. The techniques for attaching halogenated groups to polymers are well known. Amongst those most frequently used, there may be mentioned halomethylation, in particular chloromethylation, of polymers containing aromatic groups, such as the polymers of formula (VI) and the treatment, by means of epihalohydrins, in particular epichlorohydrin, of polymers containing hydroxylic groups. Particular examples of such hydroxylic polymers are poly(hydroxy-ethers) consisting of a plurality of units of the formula

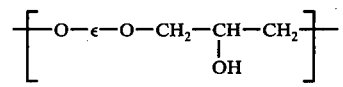

in which the symbol ε represents a divalent radical of the formula:

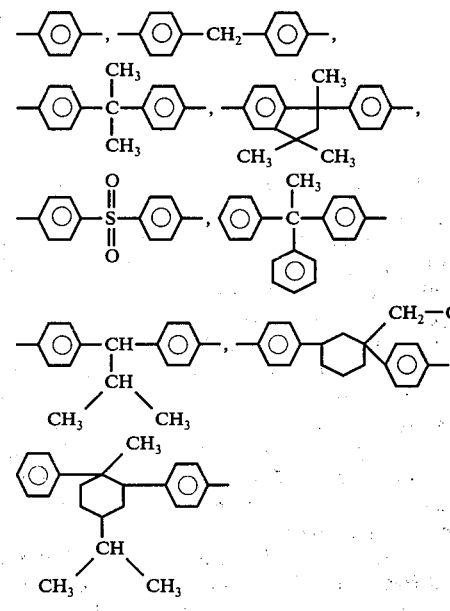

Typical tertiary amines which can react with the halogenated polymers described above include trialkylamines possessing unsubstituted alkyl radicals such as trimethylamine, triethylamine and tripropylamine, trialkylamines in which at least one of the alkyl radicals is substituted by a functional group, such as the N-dialkylalkanolamines, the N-alkyldialkanolamines and the trialkanolamines, for example dimethylethanolamine and triethanolamine; heterocyclic amines such as pyridine, the picolines, the lutidines, the N-alkylpiperidines and the N,N'-dialkylpiperazines; quinoxaline and the N-alkylmorpholines; and juxtanuclear aromatic amines such as N,N'-dimethylaniline or extranuclear aromatic amines. Generally, the amines used have 3 to 12 carbon atoms.

Amongst the above-mentioned poly(hydroxy-ethers), the polymers possessing the following recurring unit:

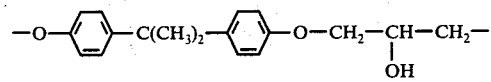

are preferred. These poly(hydroxy-ethers) are preferably treated with epichlorohydrin, the amount of the latter reagent being such that the ratio $$\frac{\text{number of mols of epichlorohydrin}}{\text{number of OH groups of the polymer}}$$

is suitably between 0.2 and 5.

In the preparation of the polymers according to this invention, the sulphonic acid polymer and the ammonium polymer, as defined above, are each dissolved in an organic medium. This organic medium can consist of a single solvent or of a mixture of solvents. The solvent used in the preparation of the poly(sulphonic acid) solution can be different from that used for the preparation of the poly (ammonium salt) solution, subject to the condition that the solvent for one polymer also must be a solvent for the other polymer, and also subject to the condition that the two solvents are miscible with one another.

The choice of solvent naturally depends on the nature of the polymer. In general however, the various polymers mentioned above are soluble in aprotic polar solvents, such as dimethylformamide (DMF), dimethylacetamide (DMAC), dimethylsulphoxide (DMSO), hexamethylphosphotriamide (HMPT), 2-N-methylpyrrolidone (NMP), sulpholane and ethylene carbonate. It is of course possible to use mixtures of these solvents with one another and/or with other organic solvents such as ketones and esters.

The initial concentration of the poly(sulphonic acid) and poly(ammonium salt) solutions has an influence on the physical appearance of the polymer obtained. In general terms, with a view to obtaining continuity in the ionically crosslinked polymer, the concentration of each of the starting polymers should be greater than 0.5% and preferably greater than 1%. The upper concentration limit is determined essentially by technological demands. In general terms, this limit is of the order of 50%, but this is not critical.

The preparation of the poly(sulphonic acid) and poly(ammonium salt) solutions can be carried out in accordance with the techniques generally employed for the preparation of polymer solutions. Usually, in a first stage, the polymer is dispersed in the solvent maintained at a relatively low temperature, for example −20° to +20° C.; thereafter, the temperature is gradually increased until limpid and homogeneous solution is obtained. The final temperature depends on the nature of the polymer and of the solvent. It is generally between 20° and 100° C.

As is apparent from the value of the ratio $n/m$ given above, one or the other of the sulphonic acid polymer and the ammonium polymer can be present in excess, as regards the number of ionic groups, in the reaction mixture. Preferably, the ratio $n/m$ is between 0.2 and 5.

The mixing of the two above-mentioned solutions can be carried out at a temperature which is generally between 10° and 100° C. Preferably, the mixing is carried out at ambient temperature (20° to 25° C.). The formation of the complex polyelectrolyte manifests itself in a rapid increase in viscosity of the solution, as soon as the two solutions are brought into contact. The introduction into this new solution of a strongly ionised electrolyte, comparable to the "ionic shields" described in the prior art, causes a considerable decrease in the viscosity, which demonstrates, according to generally acceptable interpretations, that this electrolyte has broken, at least partially, the ionic bonds formed between the sulphonic acid polymer and the ammonium polymer.

The solution of the polymer of formula (I) can be used directly for the production of films or shaped articles. It sometimes happens, especially if it is desired to prepare a membrane by casting a complex polyelectrolyte solution, that the viscosity of the solution obtained in the reaction medium is too high. It is then sufficient to dilute this solution in order to obtain the desired viscosity.

It is apparent from what has been said above that the use of an ionic shielding solvent is by no means indispensable in using the polymers of this invention. It is evident, however, that the use of a strongly ionised electrolyte which is soluble in an organic medium, such as lithium chloride, in order to decrease the viscosity of the complex polyelectrolyte solution, does not fall outside the scope of this invention.

The films and membranes obtained from solutions of the complex polyelectrolytes of this invention can be planar, tubular, spiral or of any other shape; they can have an isotropic or anisotropic structure. By membrane with an "isotropic" structure is meant a membrane which has a dense structure or a uniform porosity throughout its entire thickness; by an "anisotropic" membrane is generally meant a membrane which has a porosity gradient from one face to the other, it being possible, in the limiting situation, for one of the faces to be completely free from pores.

The isotropic membranes can generally be obtained by simply casting the complex polyelectrolyte solution on a suitable surface (such as a glass plate or a metal plate, tube, spiral or tape) and then removing the solvent. The anisotropic membranes can be obtained by immersing the plate supporting the layer of polymer solution in a coagulation bath for the polymer. Generally, the coagulation bath consists of water, or of mixtures of water and organic solvents or of aqueous solutions of electrolytes.

It is to be understood that the complex polyelectrolytes according to the invention can contain fillers or plasticisers, it being possible to mix these fillers or plasticisers directly in the complex polyelectrolyte or to have incorporated them previously in the polymer and/or the initial ammonium polymer. Likewise, the membranes can consist of the filled or unfilled polymer film alone, or they can contain a reinforcement such as a woven fabric, a knitted fabric or a net based on natural or synthetic fibres.

The complex polyelectrolytes of this invention can be used in a number of ways; they can be used in the textile field, in the form of yarns, fabrics or of treatment compositions for yarns or fabrics, intended to provide certain properties such as dyeing affinity, and hydrophilic and antistatic character; these various desired properties can be adjusted as a function of the anionic or cationic excess in the polymer.

The membranes of this invention can be used especially for the fractionation of solutions using ultrafiltration, inverse osmosis and dialysis techniques. These membranes, and in particular the anisotropic membranes, have in effect a high specific degree of rejection towards macromolecular species whilst having a high permeability towards water. It should be noted that a heat treatment in water makes it possible to change the structure of the membrane and to vary its stoppage zone (limit of molecular weight of the compounds which pass through the membrane) from a high value (for example 10 to 15,000) to a very low value (of the order of 2 to 300). These membranes combine good mechanical properties with their permeation properties, and this makes it possible for them to withstand pressures in use without being damaged, for example in ultrafiltration.

The films of complex polyelectrolytes of this invention can also be used as battery dividers. They can also be used in medical applications, especially in artificial kidneys and lungs because of the dialysis and gas permeation properties of the membranes and, more generally, in the manufacture of prostheses and any article which must be brought into contact with blood, because these polymers possess noteworthy antithrombogenic properties.

The polymers of this invention can also be used as artificial leathers or in the production of coatings which conduct electricity or of antistatic coatings. It will be appreciated, however, that these applications are illustrative only.

The following Examples further illustrate the present invention. Temperatures are given in degrees Centigrade.

EXAMPLE 1

1. A solution, $A_1$, with a viscosity of 145 poises at 25°, is prepared from 9 g. of an acrylonitrile-sodium methallyl-sulphonate copolymer ($a_1$) and 41 cm$^3$ of dimethylformamide (DMF). This copolymer, the ion exchange capacity of which is 1,265 meq/kg and which contains one —SO$_3$Na group per approximately 40 carbon atoms, was prepared by polymerisation of the monomers in an aqueous solution containing 300 g. of sodium chloride per litre of solution.

A solution $B_1$, with a viscosity of 33 poises at 25°, is prepared from 9 g. of an acrylonitrile/3-vinyl-6-methyl-pyridine, quaternised by means of methyl sulphate, copolymer ($b_1$) and 41 cm$^3$ of DMF. This copolymer has an ion exchange capacity of 1,265 meq/kg and contains one quaternary ammonium group per approximately 39 carbon atoms. The nonquaternised copolymer was obtained by copolymerisation of the two monomers dissolved in dimethylsulphoxide, in the presence of azo-bis-isobutyronitrile.

The ratio $$\frac{\text{number of } -SO_3Na \text{ groups in the copolymer } a_1}{\text{number of } N^+ SO_4CH_3^- \text{ groups in the copolymer } b_1}$$

is approximately equal to 1.

The solutions $A_1$ and $B_1$ are mixed and immediately a solution ($A_1B_1$), with a viscosity greater than 2,000 poises, of the polymer resulting from the ionic crosslinking formed between the copolymers ($a_1$) and ($b_1$) is obtained. This ionic crosslinking is demonstrated by the fact that if 250 mg. of lithium chloride are incorporated in a reaction mixture, a marked decrease in the viscosity is observed.

2. The viscosity of the solution $A_1B_1$ is reduced to 1,200 poises at 25° C., by diluting it using DMF, and then this solution is spread on a glass plate (thickness of the layer 300 μ) and the whole is immediately immersed in water at 25°. The membrane becomes detached of its own accord after 3 minutes. This membrane, which has an overall thickness of 140 μ, is white and opaque and has a shiny face (air side) and a matt face (glass plate side).

3. The membrane is immersed for 10 minutes in water at 50° and it is thereafter used in the fractionation of protein solutions. For this purpose, it is placed in an ultrafiltration apparatus, the shiny face of the membrane being on the side of the solution to be filtered. Filtration is carried out under a pressure of 2 bars (pressure difference between the upstream and downstream sides of the membrane). The degree of rejection of the proteins and the ultrafiltration flow rate are determined. It will be recalled that the degree of rejection can be defined by the number:

$$100 \times \left[1 - \frac{\text{weight of macromolecule in the ultrafiltrate, per unit volume of the latter}}{\text{weight of macromolecule in the solution to be filtered, per unit volume of the latter.}}\right]$$

The nature and the concentration of the filtered proteins, as well as the results obtained, are given below.

| | Nature of the protein | bovine albumen | ovalbumin | lysozyme |
|---|---|---|---|---|
| Solution subjected to ultrafiltration | Average molecular weight | 70,000 | 45,000 | 15,000 |
| | concentration in g/l | 1 | 1 | 1 |
| Results | Flow rate of ultrafiltrate | 0.25 cm$^3$/min.cm$^2$ | | |
| | Degree of rejection | 100% | | |

A membrane produced according to 2 above, but immersed for 10 minutes in water at 65°, has, in an ultrafiltration apparatus, a flow rate of ultrafiltrate of 0.03 cm$^3$/min.cm$^2$ (pressure 2 bars) and a degree of rejection of a dextran of molecular weight 10,000 of 74% (initial concentration 4 g/l).

4. The membrane described under 3 is examined with respect to its antithrombogenic character. To do this, a disc, 4.5 cm. in diameter, is cut out of this membrane and then 1/2 cm$^3$ of freshly removed human blood is placed on this disc, at a temperature of 37° C. The disc is then shaken every 30 seconds until the blood coagulates. It is found that coagulation occurs only after 75 minutes, at 37° C.

EXAMPLE 2

1. A solution, $A_2$, with a viscosity of 327 poises at 25°, is prepared from 15 g. of an acrylonitrile-sodium methallyl-sulphonate copolymer ($a_2$) and 68 cm$^3$ of DMF. The copolymer, prepared in the same way as that of Example 1, has an ion exchange capacity of 570 meq/kg and contains one —SO$_3$Na group per approximately 94 carbon atoms.

A solution, $B_2$, with a viscosity of 71 poises at 25° C., is prepared from 9.8 g. of an acrylonitrile/3-vinyl-6-methyl-pyridine, quaternised by methyl sulphate, copolymer ($b_2$) and 45 cm³ of DMF. This copolymer has an ion exchange capacity of 871 meq/kg and contains one

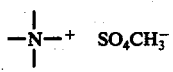

group per approximately 58 carbon atoms.

The solutions $A_2$ and $B_2$ are mixed and a solution, $A_2B_2$, with a viscosity of 1,318 poises, of a polymer resulting from the ionic bonding between the two copolymers $a_2$ and $b_2$ is obtained.

2. By adding DMF, the viscosity of the solution $A_2B_2$ is brought to 512 poises. The solution, diluted in this way, is cast on a glass plate (thickness of the layer 300 μ) and the whole is immersed in water at 20°. After 4 minutes, the membrane becomes detached from the glass plate. This membrane has a total thickness of 200 μ, and has the same appearance as the membrane of Example 1.

This membrane is used for separating various substances by ultrafiltration (pressure 2 bars, unless otherwise stated), as it is or after various treatments, as indicated below:

α — membrane used as it is:
flow rate of ultrafiltrate: 1.2 cm³/min.cm²
filtration properties: the membrane stops bovine albumen, ovalbumin, lysozyme and cytochrome C (molecular weight 12,400) 100%.

β — membrane treated for 10 minutes in water at 50° C.
flow rate of ultrafiltrate: 0.8 cm³/min. cm².
filtration properties: the membrane allows dextran of molecular weight 10,000 to pass completely.

γ — membrane treated for 10 minutes in water at 60° C.
flow rate of untrafiltrate: 0.09 cm³/min.cm²
filtration properties: the membrane stops dextran (molecular weight 10,000) with a degree of rejection of 67%.

δ — membrane treated for 10 minutes in water at 85° C.
flow rate of ultrafiltrate: 0.0017 cm³/min.cm²
filtration properties: the membrane stops raffinos (molecular weight 594) with a degree of rejection of 52%.

ε — membrane treated for 10 minutes in water at 95° C.
flow rate of ultrafiltrate: 0.0013 cm³/min.cm²(under 3 bars)
filtration properties: the membrane stops sodium chloride with a degree of rejection of 19%.

The experiments described above show that it is possible to change the filtration properties of the membrane by a simple heat treatment in water.

EXAMPLE 3

1. A solution, $A_3$, with a viscosity of 41.5 poises at 25°, is prepared from 9 g. of a sulphonated polyaryl ether/sulphone and 16 cm³ of DMF. The sulphonated polyaryl ether/sulphone, which has an ionic capacity of 830 meq/kg, was prepared according to the technique described in the Example 1 of French Pat. No. 2,040,950.

A solution, $B_3$, with a viscosity of 130.5 poises at 25°, is prepared from 5.08 g. of a phenoxy resin containing quaternary ammonium groups and 9 cm³ of DMF. The modified phenoxy resin, which has an ionic capacity of 1,470 meq/kg is prepared by reacting trimethylamine with a phenoxy resin which has first been treated with epichlorohydrin, according to the technique described in Example 1 of the French Application No. 70/22,514.

The solutions $A_3$ and $B_3$ are mixed and a solution, $A_3B_3$, with a viscosity of 169.5 poises, is obtained.

2. A part of this solution ($A_3B_3$) is cast on a glass plate (thickness of the layer 300 μ) and then the plate is immersed in water at 25°. The membrane, which becomes detached from its support after 3 minutes, is examined with respect to its antithrombogenic properties according to the technique of Example 1. § 4. Coagulation of the blood occurs only after 35 minutes.

3. Another part of the solution $A_3B_3$ is cast on a glass plate (thickness of the layer 150 μ) and then the plate is placed in an oven at 60° for 24 hours. A transparent film, of thickness 70 μ, is obtained, the mechanical properties of which are as follows:
Tensile strength: 600 kg/cm²
Elongation at break: 85% (measurements made on test pieces 50 mm. long and 6.5 mm. wide).

EXAMPLE 4

1. A solution, $A_4$, with a viscosity of 10 poises at 25°, is prepared from 8 g. of the sulphonated polyaryl ether/sulphone used in the preceding Example (830 meq/kg) and 32 cm³ of DMF.

A solution $B_4$, with a viscosity of 60 poises at 25°, is prepared from 5.26 g. of the acrylonitrile/quaternised 3-vinyl-6-methyl-pyridine copolymer used in Example 1 and 21 cm³ of DMF.

The two solutions are mixed and a solution $A_4B_4$, with a high viscosity, is obtained.

2. The solution $A_4B_4$ is diluted by adding DMF and the solution is cast on a glass plate (thickness of the layer 300 μ). The plate is immersed in water at 25°. After 5 minutes, the membrane becomes detached from the support. This membrane, of thickness 200 μ, is white and has a shiny face and a matt face.

3. During ultrafiltration, under a pressure of 2 bars, this membrane has a flow rate of ultrafiltrate of 1 cm³/min. cm² and stops lysozyme, ovalbumin and bovine albumen 100%.

4. This membrane is placed in contact with blood as described in Example 1: coagulation of the blood occurs only after 95 minutes.

EXAMPLE 5

1. A solution, $A_5$, with a viscosity of 61 poises at 25°, is prepared from 14 g. of the acrylonitrile/sodium methallyl-sulphonate copolymer of Example 1 and 86 cm³ of DMF.

A solution $B_5$, with a viscosity of 22 poises at 25°, is prepared from 9.16 g. of the acrylonitrile/quaternised 3-vinyl-6-methyl-pyridine copolymer used in Example 1 and 56 cm³ of DMF.

Mixing the two solutions leads to ionic crosslinking between the two copolymers and causes the viscosity of the mixture to increase to 335 poises.

2. The solution obtained is cast on a glass plate (thickness of the layer 300 μ) and then the latter is immersed in water at 25°. The membrane obtained after 3 minutes, of thickness 200 μ, has a matt face and a shiny face. This membrane is immersed for 10 minutes in water at 50°.

In ultrafiltration, this membrane stops bovine albumen, ovalbumin and lysozyme 100% with a flow rate of ultrafiltrate of 1 cm³/min.cm² (pressure 2 bars).

EXAMPLE 6

1. A solution, $A_6$, with a viscosity of 366 poises at 25°, is prepared from 17 g. of the copolymer of Example 1 (solution $A_1$) and 83 cm³ of DMF.

A solution $B_6$, with a viscosity of 195 poises at 25°, is prepared from 17 g. of the copolymer of Example 1 (solution $B_1$) and 83 cm³ of DMF.

Mixing the two solutions leads to ionic crosslinking between the polymers and causes the viscosity of the solution, $A_6B_6$, to increase to 1,700 poises.

2. The viscosity is brought to 671 poises by adding 411 mg. of lithium chloride.

A membrane, of thickness 200 $\mu$, is prepared by coagulation in water at 25°, as described above. In ultrafiltration, under a pressure of 2 bars, this membrane stops lysozyme, ovalbumin and bovine albumen 100%, with a flow rate of ultrafiltrate of 0.8 cm³/min.cm².

3. A film, of thickness 100 $\mu$, obtained by casting the solution, $A_6B_6$, (after lowering the viscosity to 671 poises) followed by removing the solvent by leaving it for 24 hours in an oven at 60°, is transparent and uniform. This film has the following mechanical properties:
In the dry form:
    tensile strength: 676 kg/cm²
    elongation at break: 17%
In the wet form (after 24 hours in water at 25°):
    tensile strength: 362 kg/cm²
    elongation at break: 6%.

EXAMPLE 7

1. A solution, $A_7$, with a viscosity of 87 poises at 25°, is prepared from 17 g. of the copolymer of Example 1 (solution $A_1$) and 83 cm³ of DMF.

A solution, $B_7$, with a viscosity of 2.5 poises at 25°, is prepared from 9.6 g. of a polyester-quaternised polyurethane and 47 cm³ of DMF. This polyester-polyurethane, which has an ionic capacity of 2,234 meq/kg, is obtained by quaternisation, by means of methyl sulphate, of the polymer called polymer A in French Application No. 70/18,568.

By mixing solutions $A_7$ and $B_7$, a solution of ionically crosslinked polymer is obtained, the viscosity of this solution being 110 poises.

2. This solution is cast on a glass plate (thickness of the layer 300 $\mu$) and then partially dried (5 minutes at 25° under a stream of nitrogen). The plate is then immersed in water (20° C.). The membrane becomes detached after 5 minutes. This membrane, of thickness 150 $\mu$, has a shiny face and a matt face.

In ultrafiltration, under a pressure of 2 bars, this membrane stops bovine albumen 100%, with a flow rate of 0.445 cm³/min.cm².

3. A film, of thickness 60 $\mu$, obtained by casting the solution, $A_7B_7$, on a glass plate and treating for 24 hours in an oven at 60°, has the following mechanical properties:
In the dry form:
    tensile strength: 455 kg/cm²
    elongation at break: 3.3%
In the wet form (after immersion for 24 hours in water at 25°):
    tensile strength: 117 kg/cm²
    elongation at break: 19.5%.

EXAMPLES 8 TO 14

A series of experiments is carried out using, firstly, an acrylonitrile/sodium methallyl-sulphonate copolymer ($\alpha$) with a specific viscosity of 0.862 and an ion exchange capacity of 584 meq/kg and, secondly, an acrylonitrile/3-vinyl-6-methyl-pyridine, quaternised by means of methyl sulphate, copolymer ($\beta$) (specific viscosity: 1.6, ion exchange capacity: 540 meq/kg).

14% solutions in a mixture of DMF/water (95–5% by weight) are prepared with these copolymers. Membranes are prepared from mixtures of these solutions (in different proportions), following the procedure described in Example 1 (paragraph 2). The temperature of the water is 25° C., and the detachment time is about 1 minute 30 seconds.

In the Table below, there is given:
the proportions of the copolymers in the mixture of the two copolymers,
the resulting cationic excess,
the flow rate of water through the membrane (cm³/min.cm²) under 2 bars at 20°, and
the flow rate of ultrafiltrate in an ultrafiltration of a lysozyme solution (concentration 1 g/l in a 0.1 M aqueous solution of NaCl).

| Examples | % by weight of copolymer $\alpha$ % by weight of copolymer $\beta$ | Cationic excess | Flow rate of water (2 bars, ° C) | Ultrafiltration lysozyme | |
|---|---|---|---|---|---|
| | | | | Degree of rejection | Flow rate of ultrafiltrate |
| 8 | 60 40 | 140 meq/kg | about 1.2 (1) | 100% | 0.20 |
| 9 | 65 35 | 190 meq/kg | about 0.5 (1) | 100% | 0.20 |
| 10 | 70 30 | 250 meq/kg | 0.3 (1) | 100% | 0.10 |
| 11 | | | 0.6 (2) | | |
| 12 | 75 25 | 300 meq/kg | 0.14 (3) | 100% | 0.12 |
| 13 | | | 0.26 (4) | | |
| 14 | | | 0.45 (5) | | |

(1) membrane of thickness 250 $\mu$
(2) membrane of thickness 100 $\mu$
(3) membrane of thickness 270 $\mu$
(4) membrane of thickness 150 $\mu$
(5) membrane of thickness 80 $\mu$

EXAMPLES 15 TO 19

1. Membranes are prepared by coagulation, according to the technique described in Example 3. The starting polymers are those used in this Example, but the proportions of the solutions $A_3$ and $B_3$ are such that there is an excess of positive (+) or negative (−) charges (expressed in meq/g of dry membrane). These membranes have a shiny (dense) face and a matt (porous) face.

2. The membranes, produced according to paragraph 2 of Example 3, are washed successively with water (24 hours at 25°), with an aqueous HCl solution (0.05 N) (24 hours at 25°), with deionised distilled water, with sodium hydroxide solution (0.05 N) and then again with distilled water; these membranes are finally washed with a physiological liquid (37° for 5 days).

The physiological liquid used has the following composition:

| Sodium chloride | 5.845 g/l |
| Potassium chloride | 0.224 " |
| Magnesium chloride (6H₂O) | 0.152 " |
| Sodium acetate (3 H₂O) | 5.171 " |
| Calcium chloride (6 H₂O) | 0.33 " |

3. A blood compatibility test is carried out on these membranes. This test is carried out under the following conditions:

The membranes are folded into the shape of cornets, the dense face being placed inwards, (cones, of base diameter 7 cm. and height 6 cm.) and placed within glass cones immersed in a bath of water maintained thermostatically at 37°. 30 Minutes before carrying out the test, the cornets are filled with a solution of physiological liquid. At the time of carrying out the test, the physiological liquid is poured out; 0.5 ml. of human blood, freshly removed from a radial vein with a polystyrene syringe equipped with a water-repellent needle, is poured into the cornet.

The glass cone is shaken every 30 seconds. The time which elapses between the moment when the blood is in contact with the material of the cornet and the moment when the blood remains stuck to the foot of the cornet when the cone is turned upside down is determined.

In order to facilitate comparisons, a control test is carried out for each blood sample, in which the blood is placed directly in the glass cornet. 4 Experiments (+ 4 control experiments) are carried out on each membrane and the average ($\Delta t$) of the differences in coagulation times, measured on the membrane to be tested and on the glass cone, is determined.

The following results are obtained:

| Examples | Ionic excess (meg/g) + | − | $\Delta t$ |
|---|---|---|---|
| 15 | | 0.5 | + 1 min. 40 secs. |
| 16 | | 0.2 | + 5 mins. |
| 17 | 0.2 | | + 5 mins. |
| 18 | 0.5 | | + 4 mins. 30 secs. |
| 19 | 0.65 | | + 4 mins. 30 secs. |

EXAMPLES 20 TO 25

An acrylonitrile/sodium methallyl-sulphonate copolymer with an ion exchange capacity of 1,100 meq/kg and an acrylonitrile/3-vinyl-6-methyl-pyridine, quaternised with methyl sulphate, copolymer with an ion exchange capacity of 1,100 meq/kg are used.

In both cases, the solvent is DMF and the proportions of the solutions of each of the copolymers are such that there is an excess of positive or negative charges (in meq/g of dry membrane). The membranes are prepared by coagulation, according to paragraph 2 of Example 1.

These membranes are treated in the same way as those of Examples 15-19 (paragraph 2), except that the washing with sodium hydroxide solution is replaced by a washing with NaCl.

The Table which follows gives:
the anionic or cationic excess of the membranes,
the dyeing affinity (0 indicates that the dyestuff does not become attached at all, + indicates attachment), and
the value of $\Delta t$ in the blood compatibility test (carried out under the conditions of Examples 15-19).

The acid dyestuff is alizarin blue (600 mg/liter of water). The basic dyestuff is astrazon blue (600 mg/liter of water).

| Ex. | Ionic excess (meg/g) + | − | Dying affinity Acid dye stuff | Basic dyestuff | $\Delta t$ (glass) |
|---|---|---|---|---|---|
| 20 | 0.5 | | + | 0 | +7 mins. 30 secs. |
| 21 | 0.2 | | + | 0 | +4 mins. 30 secs. |
| 22 | 0 | 0 | + | + | +4 mins. 15 secs. |
| 23 | | 0.2 | 0 | + | +6 mins. 15 secs. |
| 24 | | 0.4 | 0 | + | +5 mins. 25 secs. |
| 25 | | 0.6 | 0 | + | +6 mins. 10 secs. |

EXAMPLES 26 TO 34

The polymers of Examples 20-25 are used. The relative proportions of the solutions of each of the polymers are such that there is an ionic excess. The membranes are prepared by casting the mixture of solutions on a glass plate, followed by drying at 60° for 12 hours under a pressure reduced to 400 mm. of mercury.

After drying, the membranes remain for one week in water at 37°. Samples then undergo a heat treatment in distilled water for 8 minutes at 60 or 100° or for 1 minute at 150°. These membranes are then washed by means of physiological liquid (5 days + 37°).

The results obtained are shown in the following Table.

| | Ionic excess meg/g − | + | Heat treatment (temperature) | Dyeing affinity Acid dye-stuff | Basic dyestuff | $\Delta t$ (glass) |
|---|---|---|---|---|---|---|
| 26 | 0.6 | | — | 0 | + | +4 mins. 30 secs. |
| 27 | 0.6 | | 60° | 0 | + | +5 mins. 40 secs. |
| 28 | 0.6 | | 100° | 0 | + | +6 mins. 5 secs. |
| 29 | | 0.2 | — | + | 0 | +4 mins. 50 secs. |
| 30 | | 0.2 | 100° | + | 0 | +6 mins. 10 secs. |
| 31 | | 0.2 | 150° | + | 0 | +6 mins. 35 secs. |
| 32 | | 0.5 | — | + | 0 | +5 mins. |
| 33 | | 0.5 | 100° | + | 0 | +7 mins. 20 secs. |
| 34 | | 0.5 | 150° | + | 0 | +9 mins. 50 secs. |

I claim:
1. An ionically cross-linked, shaped or unshaped, polymer, which is insoluble in water, but soluble in a liquid organic medium without the presence of an ionic shielding solvent which contains less than one hydrophilic group per 12 carbon atoms and which corresponds to the formula:

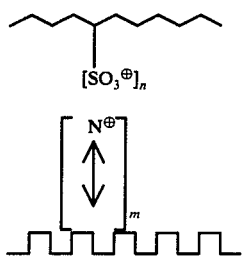

(I)

in which: the symbol $N^\oplus$ represents a quaternary nitrogen-containing group; the symbol

represents a macromolecular chain carrying groups which are capable of being linked, via a covalent bond, to $-SO_3^\ominus$ groups, the symbol

represents a macromolecular chain carrying groups which can give rise to the formation of $N^\oplus$ groups, the symbol

indicating that the $N^\oplus$ groups are linked to the macromolecular chain by at least one covalent bond, and the chains

 and

, considered together, do not contain oppositely charged groups which are capable of forming inter-chain covalent bonds, the ratio $n/m$ is between 0.1 and 10; and the nature of the units forming the macromolecular chains and the values of $n$ and $m$ being such that a polymer of the formula $(I_1)$

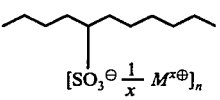

in which M represents a hydrogen ion or an alkali metal or alkaline earth metal ion and x is 1 or 2, and a polymer of formula $(I_2)$

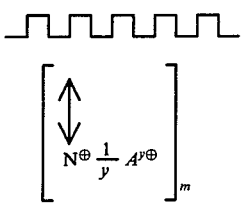

in which A represents a hydroxyl radical or the anion of an inorganic or organic acid of formula: $AH_y$, y being equal to 1, 2 or 3, said polymers of formulae $(I_1)$ and $(I_2)$ both insoluble in water, but soluble in a common liquid organic medium without the presence of an ionic shielding solvent and wherein the macromolecular chain which is linked via a covalent bond to $-SO_3^\ominus$ groups and the macromolecular chain which is liked via a covalent bond to $N^\oplus$ groups both possess a specific viscosity of greater than 0.01 measured at 25° C. on a 2 g/liter solution in dimethylformamide.

2. A polymer according to claim 1, in which the polymer of formula $(I_1)$ which gives rise to the structure:

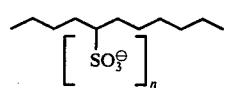

consists of a plurality of units of the formula $$-C(R_1)_2-CR_1- \atop \underset{SO_3H}{\overset{R}{|}}$$  (II)

and, optionally, units of the formula:

$$-CR_2R_3-C(R_3)_2-$$  (III)

in which each of the $R_1$ radicals, which may be identical or different, represents hydrogen or an alkyl radical with 1 to 4 carbon atoms; R represents a group selected from a simple valency bond; a wholly hydrocarbon divalent group, the free valencies of which are carried by a wholly aliphatic, saturated or unsaturated, straight or branched chain, or by an aromatic ring, or by a chain, one of the free valencies being carried by an aliphatic carbon atom and the other free valency by an aromatic carbon atom; a $-O-R'-$ or $-S-R'-$ group, R' representing a divalent group as defined above for R; a divalent group consisting of wholly hydrocarbon, aliphatic and/or aromatic groups, linked to one another by oxygen or sulphur atoms, the free valencies being carried by aliphatic and/or aromatic carbon atoms; and a divalent group as defind above in which one or more of the carbon atoms are substituted by a halogen atom or a hydroxyl radical; each of the $R_2$ radicals, which may be identical or different, represents a hydrogen atom, a halogen atom or an alkyl radical with 1 to 4 carbon atoms; each of the $R_3$ radicals, which may be identical or different, is as defined under $R_2$ or represents a $-C\equiv N$, $-OR_5$,

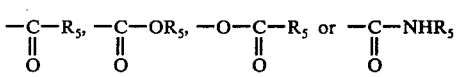

group in which $R_5$ represents a hydrogen atom or a linear or branched alkyl radical containing 1 to 30 carbon atoms, a cycloalkyl radical containing 5 or 6 ring atoms, an aryl radical, an alkoxyaryl radical or an aralkoxy radical.

3. A polymer according to claim 2 in which the polymer of formula $(I_1)$ is a copolymer of acrylonitrile and methallylsulphonic acid or a salt thereof.

4. A polymer according to claim 2 in which the polymer of formula $(I_1)$ is a copolymer of acrylonitrile and sodium methallyl sulphonate.

5. A polymer according to claim 4 in which between 4 and 20% by weight based on the weight of the copolymer of units of formula (I₁) contain —SO₃⊖ groups.

6. A polymer according to claim 1, in which the polymer of formula (I₁) is a polycondensate comprising a plurality of units of formulae:

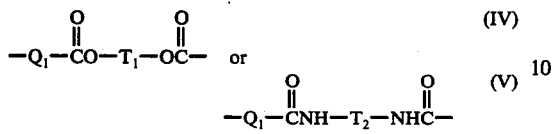

in which Q₁, which represents the radical of a diacid of the formula: HOOC — Q₁ — COOH, is an alkylene radical containing 3 to 10 carbon atoms or a phenylene radical, which alkylene or phenylene radical carries a —SO₃H substituent; each of T₁, which represents the radical of a diol of the formula: HO — T₁ — OH, and T₂, which represents the radical of a diamine of the formula: H₂N — T₂ — NH₂, represents an aliphatic radical with a straight or branched chain containing 3 to 10 carbon atoms, a cycloaliphatic radical with 5 or 6 ring carbon atoms, a monocyclic aromatic radical which is unsubstituted or substituted by one or two alkyl radicals with 1 to 4 carbon atoms, or a radical consisting of several aliphatic or aromatic radicals bonded directly to one another or via a divalent hydrocarbon radical containing 1 to 4 carbon atoms, or via an oxygen, sulphur and nitrogen atom or an -SO₂- group.

7. A polymer according to claim 1, in which the polymer of formula (I₁) is the product of reacting a sulphonating agent with a polymer containing recurring units of one or more of the formulae:

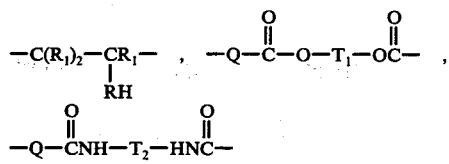

and —AR—E— in which R₁ and R are as defined in claim 2 with the proviso that R′ represents a divalent group as defined under R₃, T₁ and R₂ are as defind in claim 6, Q represents an alkylene radical containing 3 to 10 carbon atoms or a phenylene radical, and Ar, which can differ from one unit to another, represents a divalent aromatic radical which is a phenylene radical, optionally substituted by one or two alkyl or aryl radicals, or a radical of the formula:

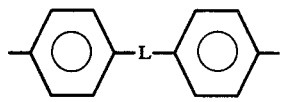

in which L represents an alkylene or alkylidene radical containing 1 to 12 carbon atoms or a —CO— group; or a divalent radical carrying at least one aromatic substituent, and E, which can differ from one unit to another, represents a —O—, —SO₂—, —(CH₂)ᵥ— or —C(CH₃.)₂— group, v being from 1 to 4.

8. A polymer according to claim 7 in which Ar represents a p-phenylene radical.

9. A polymer according to claim 8 in which the polymer of formula (I₁) is a polyaryl ether sulphone.

10. A polymer according to claim 1 in which the polymer of formula (I₂) which gives rise to the structure

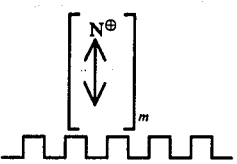

is obtained by reacting a quaternising agent with a polymer containing a plurality of units of the formula:

and, optionally, units of formula (III) as defined in claim 2, in which R₁ is as defined in claim 2 and R₆ represents a —N(R₇)₂ group or a linear or branched alkyl radical containing 1 to 12 carbon atoms, a cycloalkyl radical with 5 or 6 ring carbon atoms or a phenyl radical, which radical carries a —N(R₇)₂ substituent, or a heterocyclic radical containing one or two nitrogen atoms with 5 or 6 ring members, optionally combined with one or two aromatic rings, the atom or at least one of the atoms of the said nitrogen being bonded either by its three valencies to adjacent carbon atoms in the heterocyclic ring, or by two valencies to said ring carbon atoms and by the third to a —R₇ group, each of the R₇ radicals, which may be identical or different, representing an alkyl radical with 1 to 6 carbon atoms.

11. A polymer according to claim 10 in which the polymer of formula (I₂) is a copolymer of acrylonitrile and a vinylpyridine.

12. A polymer according to claim 11 in which the polymer of formula (I₂) is a copolymer of acrylonitrile and 3-vinyl-6-methyl-pyridine.

13. A polymer according to claim 12 in which between 4 and 30% by weight based on the weight of the copolymer contain amino monomer units.

14. A polymer according to claim 1, in which the polymer of formula (I₂) is the product of reacting a quaternising agent with a polycondensate containing a plurality of units of formulae:

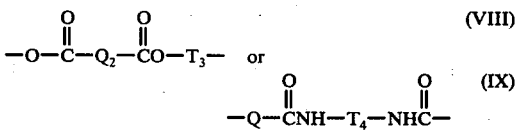

in which Q₂ represents the radical of a diacid of the formula: HOOC—Q₂—COOH, T₃ represents the radical of a diol of the formula: HO—T₃—OH and T₄ represents the radical of a diamine of the formula: H₂N—T₄—NH₂, at least one of Q₂ and T₃ or T₄ containing a tertiary nitrogen atom.

15. A polymer according to claim 14, which comprises rows of units of formula (VIII) bonded to other rows of the same units via

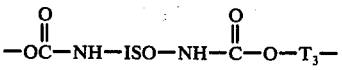

groups and, optionally,

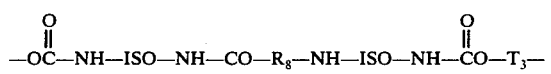

groups in which ISO represents the radical of a diisocyanate of the formula:

and $R_8$ represents a valency bond or a —O—, —NH—NH—, —NH—T$_4$—NH—, —O—T$_3$—O— or —NH—NH—CO—NH— group.

16. A polymer according to claim 15 in which the polymer of formula (I$_2$) is derived from ethyldiethanolamine, adipic acid and 4,4'-diisocyanato-diphenylmethane.

17. A polymer according to claim 10, in which the quaternising agent is an alkyl, cycloalkyl or aralkyl halide or sulphate, the alkyl, cycloalkyl or aralkyl radicals containing at most 14 carbon atoms.

18. A polymer according to claim 1 in which the polymer of formula (I$_2$) is the product of reacting a tertiary amine with a halogenated polymer containing a plurality of units of the formula:

in which Δ represents a divalent organic radical carrying a halogen substituent and E is as defined in claim 7.

19. A polymer according to claim 18, in which the halogenated polymer is the product of reacting a halomethylating agent with a polymer containing a plurality of units of the formula:

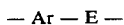

in which Ar and E are as defined in claim 7.

20. A polymer according to claim 18, in which the halogenated polymer is the product of reacting epihalohydrin with a poly(hydroxy-ether) containing a plurality of units of the formula:

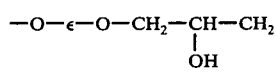

in which ε represents a divalent radical selected from radicals of the formula:

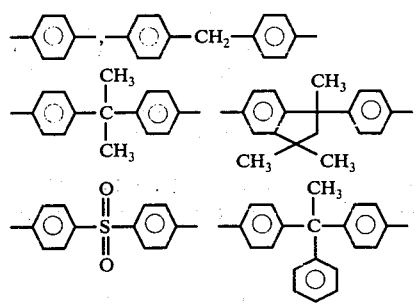

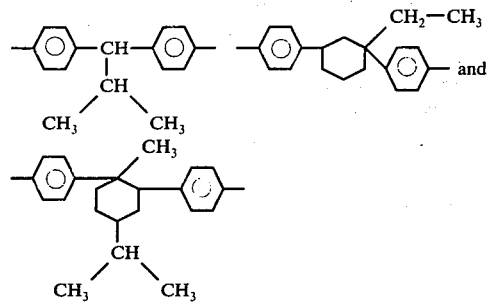

21. A polymer according to claim 18, in which the tertiary amine possesses 3 to 12 carbon atoms and is a trialkylamine, the alkyl radicals of which are either unsubstituted or substituted by a functional group, a heterocyclic amine, quinoxaline, an N-alkylmorpholine or a juxta-nuclear or extra-nuclear aromatic amine.

22. A polymer according to claim 21 in which the tertiary amine is an N-dialkylalkanolamine, N-alkyldialkanolamine, a trialkanolamine, pyridine, a picoline, lutidine, N-alkylpiperidine or N,N'-dialkylpiperazine.

23. A polymer according to claim 1 which contains, in each of the chains derived from polymers of formulae (I$_1$) and (I$_2$), less than 1 hydrophilic group per 20 carbon atoms.

24. A polymer according to claim 1 in the form of an isotropic or anisotropic membrane.

25. Process for preparing a polymer as defined in claim 1 which comprises forming an organic solution of a polymer of formula (I$_1$) and a solution of a polymer of formula (I$_2$), in the same organic solvent or in an organic solvent which is different from but miscible with the said solvent and which is compatible with the polymer of formula (I$_1$), mixing the two solutions thus produced and isolating the polymer of formula (I) thus produced.

26. Process according to claim 25 in which the specific viscosity of each of the polymers of formula (I$_1$) and (I$_2$) is greater than 0.01, measured at 25° C. on a 2 g/liter solution of polymer in dimethylformamide.

27. Process according to claim 25 in which, in each of the polymers of formula (I$_1$) and (I$_2$), there is less than 1 hydrophilic group per 12 carbon atoms.

28. In a method of ultrafiltration, dialysis or osmosis the improvement wherein the membrane is a membrane of a polymer as defined in claim 1.

29. A polymer according to claim 1 in which the specific viscosity is between 0.05 and 1.5.

30. A polymer according to claim 1 in which the ratio $$\frac{\text{number of hydrophilic groups other than} -SO_3^\ominus \text{ or } N^\oplus}{\text{number of } -SO_3^\ominus \text{ or } N^\oplus \text{ groups}}$$

is less than 1.

31. A polymer according to claim 30 in which the macromolecular chain which is linked via a covalent bond to -SO$_3^\ominus$ groups contains only a small proportion of cationic groups and the macromolecular chain which is linked via a covalent bond to N$^\oplus$ groups contains only a small proportion of anionic groups.

* * * * *